UNITED STATES PATENT OFFICE.

ROBERT H. HUTCHINSON, OF NEW YORK, N. Y., ASSIGNOR TO LOUIS A. RUIZ, OF NEW YORK, N. Y.

INSECTICIDE OR FUNGICIDE COMPOUND.

1,001,852. Specification of Letters Patent. Patented Aug. 29, 1911.

No Drawing. Application filed January 20, 1910. Serial No. 539,182.

*To all whom it may concern.*

Be it known that I, ROBERT H. HUTCHINSON, a citizen of the United States, residing at New York, in the county of New York and State of New York, have invented a new and useful Insecticide or Fungicide Compound, of which the following is a specification.

This invention relates to compositions of matter for use in spraying trees or other plants for the purpose of protecting the same from, and mitigating the evil effects of, animal or vegetable parasites, and also for the purpose of destroying such parasites and fungous growth. The particular purpose for which the compound is designed is the destruction of the San Jose scale and other insects which prey upon fruit trees.

Various compositions have been heretofore employed as insecticides and fungicides, but, so far as I am aware, none has been known which would have any degree of permanency, or which could not be quickly washed from the trees by rain, or otherwise rendered of no effect through the influence of the weather. The compounds heretofore employed, so far as I am aware, have had no penetrating, spreading, clinging, or staying qualities, so that those parasites which were not destroyed upon the application of the compound, would find settling places upon the trees or fruit and continue their work of destruction. The same objections apply to the attacks of a later brood subsequent to the application of the compound. Other compounds which have been used for the purpose of destroying these obnoxious parasites have been exceedingly objectionable for the reason that they were injurious to the trees, or else were too expensive for use or disagreeable to handle, or became dry and hard as the moisture in them evaporated.

It is the object of my invention to produce a compound for the stated purpose which, when applied to the tree, will spread over the same so as to fill all the crevices of the bark, and which will not be readily removed through the action of rain or other elements, and which may be manufactured at a comparatively slight cost, and which, when added to water, will form an emulsion which may be easily sprayed upon the trees and will thoroughly destroy all insect or fungous life.

In carrying out my invention, I employ as a base for the compound, crude wool grease obtained and freed from the wash waters in the cleansing of wool fleece, that is to say, when such fleece has been cleansed with soap and water, the original soap stock being recovered with the wool grease by a process of introducing sulfuric acid into the wash waters. This soap stock or fatty acids may be resaponified, though the major portion of the grease thus obtained is unsaponifiable. The grease from wool fleece washed with soda alone, or the grease from the fleece obtained by dissolving the same with naphtha, does not give the desired product for the purpose of my invention, because the wool grease thus obtained contains no fatty acids or soap stock. With this wool grease is combined a suitable poison, arsenic, for instance, which is added in the form or arsenate or arsenite. To this mixture is then added lime and sulfur boiled together in water in suitable proportions, according to whether the resulting solution is desired to be weak or concentrated. The mixture of the solution of the calcium sulfid, thiosulfate, and other sulfo-salts of calcium thus prepared, with the emulsified wool grease is accomplished by beating the former into the latter, a large amount is taken up and a paste-like product of about the consistency of soft soap is formed.

When the compound is to be used, the necessary quantity is mixed with water and a permanent emulsion is thereby produced, which may be readily sprayed upon the trees or plants, and which will permanently adhere thereto; the water acting as a vehicle to convey the compound to the tree, etc., and the wool grease serving as a base or medium for holding the poison on the tree or plant.

Boiled lime and sulfur is a well-known insecticide, but as heretofore used, the water evaporates from it and the calcium sulfid, etc., dries and does not spread over the tree, etc., so as to thoroughly destroy all growth and render the tree or plant proof against subsequent attacks of insects or fungoid growths. When combined with the wool grease, however, the poison will be permanently retained around or on the tree, etc., so that the latter will be immune and may develop perfect fruit.

I prepare my compound as follows: 800 pounds of crude wool grease, obtained from the cleaning of the fleeces of sheep, as hereinbefore stated, and known to the trade of this country as " degras," is mixed in an iron or other vessel with 125 pounds of soda ash (or carbonate of sodium) and 125 gallons of water, and heated, with occasional or continual agitation, until such saponification as takes place is complete and the mixture ceases to foam and becomes tranquil. To this is then added a suitable poison, preferably arsenic, in the form of an arsenate or arsenite, in the proportions of about three parts by weight of the arsenic salt to thirteen parts of water, and thirty-five gallons of this solution are agitated with the above mentioned prepared wool grease. While the mixture is moderately warm, I next intermix 73 gallons of a solution of calcium sulfid containing thiosulfate and other sulfo-salts of calcium. This may be either purchased on the market or prepared by boiling about one part by weight of lime and two-and-a-half parts of sulfur, together in water, and concentrating the liquid until it acquires a density of 33 to 34 degrees Baumé.

Saponification of what is saponifiable in the wool grease is advisable in order to produce a better poison-carrying medium.

The poison and the calcium sulfid solution may be if desired mixed together, and then incorporated with the treated wool grease.

My compound mixes easily with water, making an emulsion similar in some respects to an oil emulsion, but it has an advantage over the insecticides which have been heretofore produced, inasmuch as the emulsion will be a homogeneous mixture which will not readily separate into its constituent parts; whereas, petroleum oil for instance, requires soap to cause it to become miscible with water, and even then is not held permanently in suspension but quickly comes to the surface and is consequently sprayed upon the tree or plant in a free state so that it injures the latter. My treated wool grease remains soft and clear when applied to the tree, etc., so that it will not readily wash away or become dry, and yet being sticky will remain and hold the poison in suspension and in place indefinitely. In my compound the wool grease makes an emulsion with soap or a fatty acid and an alkali, which is unlike any other emulsion, for it retains in suspension an unsaponifiable fat which, when freed from soap suds and moisture by evaporation, is a sticky substance that holds indefinitely any poison that has been mixed with it.

I expressly disclaim the use of lanolin, as it is not an equivalent of wool grease in this connection, since it will not give the desired results, because it will not emulsify when water is added.

Having thus described my invention, what I claim as new and desire to secure by Letters Patent, is—

1. A compound for the purpose set forth consisting of saponified wool grease, a poison, and a mixture of calcium sulfid and other calcium salts produced by boiling lime and sulfur together in water and concentrating the liquor.

2. A compound for the purpose set forth, consisting of saponified wool grease, a salt of arsenic and a mixture of calcium sulfid and other calcium salts produced by boiling lime and sulfur together in water and concentrating the liquor.

3. A compound for the purpose set forth including saponified wool grease and a poison destructive to insectivorous and fungous life.

4. A compound for the purpose set forth including saponified wool grease containing an unsaponifiable fat, and a poison destructive to insectivorous and fungous life.

5. A compound for the purpose set forth including wool grease in part saponified and in part unsaponifiable, the unsaponifiable portion being in excess of the saponified portion, and a poison destructive to insectivorous life.

In testimony, that I claim the foregoing as my own, I have hereto affixed my signature in the presence of two witnesses.

ROBERT H. HUTCHINSON.

Witnesses:
   WESTMINSTER ABBEY,
   JULIUS P. MOCH.